United States Patent Office 2,898,329
Patented Aug. 4, 1959

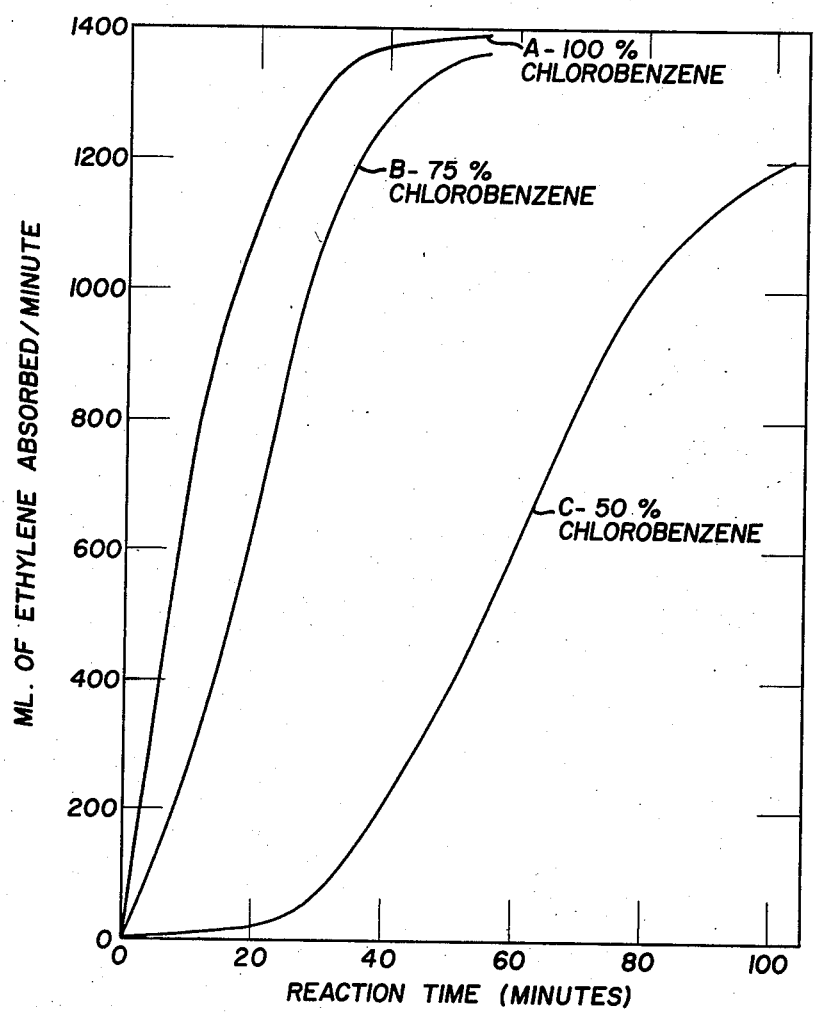

2,898,329

POLYMERIZATION PROCESS

Allen R. Kittleson, Westfield, N.J., assignor to Esso Research and Engineering Company, a corporation of Delaware Application September 29, 1955, Serial No. 537,454

9 Claims. (Cl. 260—94.9)

This invention relates to an improvement in processes, and more particularly to the polymerization of unsaturated hydrocarbons such as ethylene, with a catalyst mixture or complex of an alkyl metal compound, e.g., diethyl aluminum chloride, and a compound of a metal element of groups IVB–VIB of the periodic table of the elements, e.g., titanium tetrachloride, to make high molecular weight solid polymers or copolymers.

Ethylene has been polyerized by such a general process as, for instance, by passing ethylene gas into a liquid diluent such as heptane containing dissolved or dispersed therein a catalyst mixture or complex formed by mixing triethyl aluminum or diethyl aluminum chloride with titanium tetrachloride, using a polymerization temperature of, for instance, 50 to 100° C. and substantially atmospheric pressure. The reaction mixture is agitated continuously and polymer forms in the form of a powder or granules dispersed in the diluent; more diluent may be added if the reaction mixture becomes too thick or viscous.

Although such a process is a substantial improvement over the only previously commercially successful process for making high molecular weight polyethylene, namely, by the use of high pressure process such as 200 to 2,000 atmospheres, at a temperature of 100 to 400° C. and with either a trace of oxygen or an organic peroxide as catalyst, nevertheless it has several disadvantages frequently including requirement to pretreat the catalyst for about one-half hour or one hour or so before starting polymerization. For example, when using n-heptane as reaction medium and not using a catalyst pretreatment step, there was no spontaneous ethylene polymerization when starting at room temperature. On applying heat to increase the temperature to 58° C. during the first hour, a total of 10 g. of polymer was obtained during the period. When 100% chlorobenzene was used a spontaneous reaction took place starting at room temperature and 73 g. polymer was obtained during the first hour.

Most of the above mentioned disadvantages are overcome by the present invention which comprises the use of a polymerization reaction diluent comprising a substantial proportion of chlorobenzene (monochlorobenzene). Substantial improvement is obtained even merely by replacing 50% by volume of the hydrocarbon diluent used heretofore, e.g., normal heptane. However, far superior results are obtained when the diluent comprises at least 70% of chlorobenzene, e.g., 75%, 80%, 90%, or 100% chlorobenzene.

The invention may be applied to the polymerization of various unsaturated hydrocarbons such as ethylene, propylene, normal butenes, isobutylene, and higher alkenes, having, for instance, up to 8 or 10 carbon atoms, as well as diolefins, e.g., butadiene, isoprene, etc.

In preparing the catalyst, the alkyl metal compound to be used, is preferably one having the general formula $R_2AlX$, or one having the general formula $R_3Al$, in which R is preferably a lower alkyl group such as ethyl, propyl, butyl, or higher, e.g., up to 8 to 10 carbon atoms, or sometimes methyl; and X is a halogen, preferably chlorine. Dialkyl, particularly diethyl, aluminum chloride is preferred. The compound of a metal of groups IVB to VIB may be a halide, oxide, or other compound of elements 22 to 24, 40 to 42, 58, 72 to 74, and 90 to 92. Titanium tetrachloride is the preferred example of such metal compounds. The mixture or complex of these two catalyst components should be prepared by using a molar ratio of the alkyl aluminum compound to the titanium tetrachloride ranging from about 0.5/1 to 10/1, the preferred proportions being about 1/1 to 3/1.

The catalyst may be prepared in various ways but it is convenient to dissolve the desired amount of each of the two separate components in a suitable solvent and then mix the two solutions at the desired catalyst preparation temperature which may be about 0 to 50° C., preferably about 20 to 30° C., or about room temperature. The catalyst solvent is preferably either chlorobenzene if the polymerization diluent to be used is all or mainly chlorobenzene, or it may be any other suitable inert solvent such as normal heptane or a refined kerosene or gas oil fraction, etc., in case the polymerization diluent is to be a mixture containing a minor proportion of diluent other than chlorobenzene.

In the use of such complex catalysts as recently used heretofore, it has generally been found necessary or at least desirable to pretreat the catalyst mixture or complex resulting, for instance, from the mixing of diethyl aluminum chloride with titanium tetrachloride, by stirring it for a substantial period of time, e.g., one-half hour to one hour or more, and accordingly, this had been conveniently done in a separate catalyst preparation zone or container followed by transfer to the polymerization reactor. However, it is now found that with the use of a polymerization diluent comprising at least 50% of chlorobenzene, the extended pretreatment of the catalyst complex is not necessary, and accordingly, a desirable procedure is to charge the diluent, i.e., chlorobenzene alone or with a minor amount up to 50 volume percent, of normal heptane or other suitable diluent into the reactor, and then add the two separate catalyst components simultaneously or one after the other in either order, with agitation. Polymerization may then be started immediately by passing ethylene gas (or other reactant) directly into the catalyst-diluent dispersion or solution.

It is, of course, essential or at least desirable, to prevent contact of the catalyst components or complex with oxygen, moisture, or other harmful materials which interfere with the desired polymerization of the ethylene to high molecular weight solid polymer. This may be done by blanketing the catalyst containers, polymerization reactor, etc., with nitrogen or other suitable inert gas.

The temperature to be used during the polymerization may vary over a fairly wide range, for instance, about 0 to 100° C., although it is preferred to start the reaction at room temperature or about 20 to 40° C., and then let the temperature rise due to heat of polymerization, up to the desired operating range of about 50 to 90° C. or preferably about 60 to 70° C., with the application of cooling to prevent overheating. The pressure may be substantially atmospheric or, if desired, a slightly elevated pressure up to 5 or 10 atmospheres. Atmospheric pressure is preferred.

The rate of polymerization is found to be greatly accelerated by the use of chlorobenzene as polymerization diluent, or as the main constituent thereof. The rate of polymerization is readily determined by the rate of absorption of ethylene during the reaction. Normally an initial ethylene feed rate of about 800 to 1200 cc. of ethylene gas per minute may be used per gram of catalyst. The ethylene feed rate may then be either slightly increased or decreased for proper control of the temperature, or to prevent sucking air back into the polymerization reactor if polymerization is excessively fast. The induction period of about 30 to 60 minutes generally observed when normal heptane is used as the sole diluent during polymerization, is either greatly reduced or eliminated by the use of chlorobenzene, as will be more clearly apparent from the detailed data given herebelow.

After the polymerization has proceeded to the desired extent, preferably until the catalyst activity becomes reduced below a practical value, the reaction is stopped by adding a suitable inactivator such as 10 to 30% or so of isopropanol, or other alcohol, directly to the reactor and then stopping the ethylene feed. The polymer may be suitably recovered by filtration to remove the major portion of liquid diluent and then the resulting filter cake may be slurried by mixing it with an additional amount of isopropanol, which may suitably be about 1 to 5 times the amount used for inactivating the reaction. The resulting slurry may then be stirred, desirably for 5 to 30 minutes or so, preferably for about 15 to 20 minutes, while heating it to a temperature of about 50 to 80° C., preferably about 60 to 70° C., to assist in removing residual catalyst constituents from the polymer. The slurry is finally filtered, and the polymer dried to give a granular powder. In the case of polyethylene, the molecular weight will depend on several variables such as the catalyst components and proportions thereof, and the polymerization temperature, but normally will be from about 5,000 to 500,000 and preferably about 20,000 to 100,000, as determined by the Harris modification of the Staudinger method.

Although heretofore it has been difficult or impossible to get catalyst efficiencies greater than about 20 to 100, or possibly 150 grams of polymer per gram of catalyst, the present invention has yielded catalyst efficiencies ranging normally from 150 or 200 up to 400 or 500, and may go up to 1,000 grams, of polymer per gram of catalyst.

Another advantage of this invention is that there is substantial freedom from reactor fouling, i.e., little or no formation of skin type polymer on the inner walls of the polymerization reactor or on the surfaces of the agitator or on any of the other parts of the reactor equipment exposed to the reaction mixture during polymerization. This permits repeated use of a reactor for many cycles in batch operation without shutdown for cleaning the reactor and other fouled surfaces, and also facilitates continuous operation.

The objects and advantages of the invention will be better understood from a consideration of the following experimental data:

*Example I*

Ethylene was polymerized in a batch operation by first charging chlorobenzene as diluent into the reactor, then adding a solution of 0.0044 mole of $TiCl_4$ dissolved in chlorobenzene, and then adding a solution of 0.0044 mole of diethyl aluminum chloride in chlorobenzene, with agitation, at laboratory room temperature, in a flask blanketed with nitrogen. Then the total volume of diluent was brought up to 800 ml., and ethylene gas was immediately bubbled into the reactor below the surface of the catalyst dispersion without any catalyst pretreatment holding time. The starting temperature was 26° C. Polymerization started immediately with ethylene being absorbed and polymerized very rapidly. At 10 minutes after starting the ethylene feed, the absorption rate was about 760 ml. of ethylene per minute. At the 15-minute time, the absorption rate had increased to 960 ml. and at 30 minutes the absorption rate had risen to 1320 ml. At the 60-minute (1-hour) time the absorption rate had increased slightly further to 1400 ml./min.

During this polymerization run, the temperature had fairly rapidly increased to the desired operating temperature range of about 60 to 70° C., where it was maintained by application of a cooling bath under the reactor flask. This polymerization run was continued for a total of 210 minutes, at which time about 200 ml. of dried isopropanol was added to inactivate the catalyst. Ethylene feed was stopped and the reactor contents filtered. The resulting filter cake, containing the granular polyethylene together with some residual catalyst contaminants, was then slurried in 1 liter of isopropanol, stirred 15 to 20 minutes, while heating to about 60 to 70° C. to assist in separating residual catalyst constituents from the polyethylene particles. The slurry was then filtered and dried to yield the polyethylene in the form of a fine granular powder. This product was found to have a molecular weight of about 24,000 (by the Harris modification of the Staudinger method). The catalyst efficiency from this run amounted to 160 grams of polymer per gram of catalyst. This is exceedingly good compared to relatively low catalyst efficiencies of about 20 to 100 or 130 grams of polymer per gram of catalytt which had been previously obtained with normal heptane as polymerization reaction diluent instead of the chlorobenzene used in the present run. It is also interesting to note that in this run with chlorobenzene diluent there was no reacting fouling; i.e., there was no deposition of polymer film on the walls of the reactor or on the surfaces of the agitator, etc.; this is in contrast to a substantial amount of reactor fouling which generally or at least frequently occurs when carrying out a similar polymerization using n-heptane as diluent.

*Example II*

An ethylene polymerization run was made like Example I except that the two catalyst components were used in a ratio of 1.2/1 of diethyl aluminum chloride to $TiCl_4$, and that both of these constituents were added to the reactor in the form of a solution of about .0053 mole of diethyl aluminum chloride (0.6 g.) in 100 ml. n-heptane solvent and .0044 mole (0.8 g.) of $TiCl_4$ in 100 ml. n-heptane, and the overall composition of the polymerization reaction diluent was about 75 vol./percent of chlorobenzene (600 ml.), and 25% (200 ml.) of n-heptane (200 ml.). The composition of the diluent at the start of the run was 75% chlorobenzene and 25% n-heptane, and then additional chlorobenzene was added periodically throughout the run, in four installments of about 150 ml. each, added at 116, 176, 200 and 232 minutes, respectively, after the start of ethylene feed to the reactor.

The temperature of the reaction mixture was 26° C. at the start of the run, increased to 51° C. at 30 minutes and had reached 65° C. at 60 minutes, then was maintained from 62 to 64° C. up to 110 minutes, from 64 to 67° C. up to the 230-minute time, up to 71° C. at 270-minute time and finally had reached a temperature of 80° C. at the end of the run at 360-minute time. The rate of absorption of ethylene (indicating the amount of polymerization) rose rapidly from 0 to about 1,000 ml. per minute at the 20-minute time and up to 1300 ml. at 40-minute time, remained substantially constant up to the 116-minute time when additional chlorobenzene was added, as in Example I. This accelerated the ethylene absorption which quickly increased to 1,600 at the 120-minute time, further up to 1,900 ml. at 160-minute time. It remained at that level to 176-minute time when the addition of more chlorobenzene accelerated it further up to 2,100 ml./min. at the 200-minute time. The last two additions of chlorobenzene did not effect further acceleration of ethylene absorption, probably due to gradual lowering of the catalyst effectiveness. The ethylene absorption decreased gradually from 2,100 ml./min. at the 200-minute time down to about 300 ml./min. at the 360-minute time when the reaction was stopped.

The overall catalyst efficiency in this run was the extremely high value of 428 grams of polymer per gram of catalyst, and the molecular weight was 26,000. Just as in Example I, there was no reactor fouling in this run.

Example III

Example II was duplicated except that in this case the starting composition of the diluent was 50% (400 ml.) chlorobenzene and 50% (400 ml.) n-heptane, the two catalyst components having been added in the form of solutions in n-heptane. A 1/1 ratio of diethyl aluminum chloride/$TiCl_4$ was used. A total of 450 ml. of chlorobenzene was added during the run to maintain satisfactory mixing.

In this run, although the temperature at the start was the same (26° C.) as in Examples I and II, there was an induction period of about 30 minutes before the polymerization reaction started, thus indicating that the use of 50% chlorobenzene is not nearly as good as a larger amount, such as from 70 to 100%. However, it was not necessary to actually heat the mixture to start polymerization, and after the reaction once had started, the ethylene absorption rate increased to 200 ml./min. at the 40-minute time and then increased quite regularly up to about 1,000 ml. at the 80-minute time, then to about 1,150 at the 120-minute time, about 1,700 at 160-minute time, about 1,800 at 180-minute time, 2,000 ml./min. at 200-minute time and then gradually reduced to about 1,000 ml. at the 300-minute time, at which the reaction was stopped. The main part of the polymerization took place over the preferred operating temperature range of about 60 to 70° C.

The overall catalyst efficiency of this run was 388 grams of polymer per gram of catalyst, and the molecular weight of the product was 26,000. There was a very slight trace of fouling of the interior surfaces of the reactor in this run, but not nearly as much as would be obtained under similar polymerization conditions except using 100% n-heptane as reaction diluent.

It should also be noted that under similar polymerization conditions, but using 100% n-heptane diluent, and a starting temperature of 26° C., there would be an exceedingly long induction period of about 40 minutes or more before the reaction would start of its own accord at 26° C. Under such circumstances, it would normally be necessary to heat the reactor up to a temperature of at least about 55° C. to make the reaction start, when using n-heptane as sole diluent.

The accompanying drawing shows the rate of ethylene absorption progressively from the start of ethylene feeding, for the first 60 or 100 minutes, for the three different runs, with different amounts of chlorobenzene in the reaction diluent at the start of ethylene feeding.

Referring to the drawing, curves A, B and C represent the Examples I, II and III, respectively, hereinabove. These curves emphasize the tremendous acceleration of the polymerization reaction obtained by the use of chlorobenzene in the diluent in a concentration of at least 50% (curve C), with the best results being obtained with 75% (curve B) and 100% (curve A) chlorobenzene. Curves B and A show that with 75 to 100% chlorobenzene there is substantially no induction period, and the polymerization of ethylene starts immediately upon feeding ethylene into the catalyst-diluent dispersion even at the ordinary laboratory room temperature of 26° C.

It is not intended that this invention be limited to the specific examples and modifications which have been given merely for the sake of illustration, but only by the appended claims in which it is intended to claim all novelty inherent in the invention and all modifications coming within the scope and spirit of the invention.

What is claimed is:

1. In the process of polymerizing unsaturated hydrocarbons selected from the group consisting of ethylene and propylene in the presence of a polymerizing amount of a catalyst complex of an alkyl aluminum compound containing at least 2 alkyl groups and a titanium halide compound using a molar ratio of alkyl aluminum compound to the titanium compound of about 0.5/1 to 10/1, at a temperature of about 0 to 100° C., and pressure of about 1 to 10 atmospheres, and in the presence of a liquid diluent, the improvement comprising using as diluent an organic liquid comprising at least 50 vol. percent of monochlorobenzene, whereby a catalyst efficiency above 150 grams of polymer per gram of catalyst is obtained.

2. Process according to claim 1 in which the diluent contains at least 70% of monochlorobenzene.

3. Process according to claim 1 in which the diluent contains 25% heptane and 75% monochlorobenzene.

4. Process according to claim 1 in which the diluent is 100% monochlorobenzene.

5. In the process of polymerizing ethylene in the presence of a polymerizing amount of a catalyst complex of an alkyl aluminum compound containing at least two alkyl groups, and $TiCl_4$, using a molar ratio of alkyl aluminum compound to $TiCl_4$ of about 0.5/1 to 10/1, at about 0 to 100° C. and a pressure of about 1 to 10 atmospheres, the improvement comprising carrying out the polymerization using as diluent an organic liquid comprising at least 70 vol. percent of monochlorobenzene, whereby a catalyst efficiency above 200 grams of polymer per gram of catalyst is obtained, and whereby there is substantially no fouling of the reactor or any other surfaces of the polymerization equipment coming in contact with the polymerization reaction liquid during polymerization.

6. Process according to claim 5 in which the alkyl aluminum compound is diethyl aluminum chloride.

7. Process according to claim 5 in which the catalyst complex is made from 1 to 2 moles of diethyl aluminum chloride and 1 mole of $TiCl_4$.

8. Process according to claim 5 carried out by mixing the two catalyst components and the diluent, and immediately, without substantially any catalyst pretreating period, adding ethylene gas to effect polymerization thereof.

9. Process according to claim 5, in which some additional monochlorbenzene is added periodically during the course of polymerization.

References Cited in the file of this patent
FOREIGN PATENTS
533,362    Belgium _____ May 16, 1955